(12) United States Patent
Teglia et al.

(10) Patent No.: US 7,373,463 B2
(45) Date of Patent: May 13, 2008

(54) ANTIFRAUD METHOD AND CIRCUIT FOR AN INTEGRATED CIRCUIT REGISTER CONTAINING DATA OBTAINED FROM SECRET QUANTITIES

(75) Inventors: Yannick Teglia, Marseilles (FR); Pierre-Yvan Liardet, Peynier (FR)

(73) Assignee: STMicroelectronics S.A., Montrouge (FR)

( * ) Notice: Subject to any disclaimer, the term of this patent is extended or adjusted under 35 U.S.C. 154(b) by 532 days.

(21) Appl. No.: 10/776,416

(22) Filed: Feb. 11, 2004

(65) Prior Publication Data
US 2004/0162991 A1 Aug. 19, 2004

(30) Foreign Application Priority Data
Feb. 13, 2003 (FR) .................... 03 01781

(51) Int. Cl.
*G06F 12/00* (2006.01)
(52) U.S. Cl. ............ 711/154; 712/224; 713/190
(58) Field of Classification Search ........... 711/163; 713/190; 712/224
See application file for complete search history.

(56) References Cited

U.S. PATENT DOCUMENTS

| | | | |
|---|---|---|---|
| 5,734,855 A * | 3/1998 | Sato et al. | 712/219 |
| 5,944,833 A * | 8/1999 | Ugon | 713/400 |
| 6,279,102 B1 * | 8/2001 | Morrison | 712/216 |
| 6,327,661 B1 * | 12/2001 | Kocher et al. | 713/193 |
| 6,671,664 B1 * | 12/2003 | Mangelsdorf | 703/26 |
| 6,748,410 B1 * | 6/2004 | Gressel et al. | 708/491 |
| 6,981,130 B2 * | 12/2005 | Gupte et al. | 712/218 |
| 7,036,002 B1 * | 4/2006 | Ugon | 712/228 |
| 2003/0044014 A1 * | 3/2003 | Liardet et al. | 380/268 |
| 2005/0021990 A1 * | 1/2005 | Liardet et al. | 713/194 |
| 2005/0055596 A1 * | 3/2005 | Abe et al. | 713/500 |

FOREIGN PATENT DOCUMENTS

DE 199 36 890 A 4/2000

OTHER PUBLICATIONS

French Search Report from related French Application No. 0301781 No. 0301781, filed Feb. 13, 2003.
May, D. et al., Random Register Renaming to Foil DPA, Cryptographic Hardware and Embedded Systems, 3rd International Workshop, Ches 2001, Paris, France, May 14-16, 2001 proceedings, Lecture Notes in Computer Science, Berlin: Springer, DE, vol. 2162, May 14, 2001, pp. 28-38, XP001061158.

* cited by examiner

*Primary Examiner*—Matthew Kim
*Assistant Examiner*—Ryan Dare
(74) *Attorney, Agent, or Firm*—Lisa K. Jorgenson; William R. McClellan; Wolf, Greenfield & Sacks, P.C.

(57) ABSTRACT

An integrated circuit and an antifraud method implementing at least one operation involving at least one secret quantity, and functionally including upstream and downstream of the operator at least one source register and at least one destination register, respectively, and including means for loading a random number at least in the destination register.

7 Claims, 2 Drawing Sheets

ANTIFRAUD METHOD AND CIRCUIT FOR AN INTEGRATED CIRCUIT REGISTER CONTAINING DATA OBTAINED FROM SECRET QUANTITIES

BACKGROUND OF THE INVENTION

1. Field of the Invention

The present invention relates to the field of integrated circuits and, more specifically, to the protection of data or secret quantities processed by integrated circuits against fraud attempts aiming at pirating these data.

2. Discussion of the Related Art

An example of an application of the present invention relates to the field of smart cards in which secret quantities used to cipher or encrypt data coming from the outside are contained in the integrated circuit chip.

Among possible frauds, the present invention is more specifically concerned with fraud attempts based on an examination of the signature of a physical parameter of the integrated circuit executing the ciphering function or more generally an operation involving a secret quantity. This physical signature on the integrated circuit may correspond, for example, to a variation of its temperature, of its current consumption, or of its electromagnetic radiation. Attacks by statistical analysis of the current consumption of an integrated circuit are known as DPA (differential power analysis) attacks. Such attacks consist of making hypotheses about the handled secret key(s) while the data input into the algorithm (coming from the outside) and the algorithm itself are known. Since the algorithm is known, the way in which the secret quantity is mixed with the input data by this algorithm is known. By varying the input data on the basis of a same key hypothesis, the leakage source (for example, the current consumption) of the integrated circuit can be analyzed and an average signature (trace), which can lead to the discovery of the secret quantity by determining the right hypothesis, can be obtained.

DPA-type current consumption attacks are described, for example, in an article "Differential Power Analysis" by Kocher, Jaffe, and Jun, published by Springer Verlag LNCS 1666, in 1999, in the context of the CRYPTO 99 conference (pages 388-397).

More generally, an article "Side Channel Cryptoanalysis of Product Ciphers" by J. Kelsey, P. Schneier, D. Wagner, and C. Hall, published in the Journal of Computer Security, Vol. 8, No. 2-3, 2000, pp. 141-158, describes the principle of attacks to which the present invention applies.

In practice, the data sensitive to physical signature analysis attacks are present at the level of the registers of temporary data and key storage in the form of rising or falling switching edges (from 0 to 1, or from 1 to 0), that is, upon introduction of the data in the registers.

FIG. 1 illustrates a conventional example of an algorithmic function of the type to which the present invention applies.

Input data X are combined by a function f (block 1, f(X,K), with a secret quantity K contained in the integrated circuit executing function f. The provided result is data Y corresponding, in this example, to data X ciphered by key K.

FIG. 2 arbitrarily illustrates as an example two successive steps of execution of a ciphering function (for example, function f of FIG. 1). Such an execution uses registers for storing the digital data. These registers have been symbolized in FIG. 2 in the form of two input registers 2 (Rs1) and 3 (Rs2) forming source registers for an operator 4 (OP) executing a logic or arithmetic function on the contents of registers 2 and 3. The result of operator 4 (OP) is stored in a destination register 2' (Rd1) and, if operator OP provides two result words, in a second destination register 3' (Rd2) shown in dotted lines in FIG. 2.

If function f to be executed comprises several successive operations, destination registers 2' and 3' of the first step or operator 4 generally become the source registers 2 and 3 of a second step or operator 4' (operator OP'). In FIG. 2, the two successive operations have been separated by a dotted line 5. Similarly to the first step, operator 4' provides its result in one or several destination registers 2' and 3'.

Conventionally, for each new execution of an algorithm, the source and destination registers, whether they are common or separate according to applications, are reset to a predetermined value (for example, zero). Afterwards, the states that they contain depend on the introduction of the different data and especially on the secret quantity which is likely to be pirated. The most sensitive register is the destination register since the source register, if it has not yet been reset, corresponds to a destination register transformed by a preceding operation.

SUMMARY OF THE INVENTION

The present invention aims at improving the security of integrated circuits processing secret data against attacks by physical signature analysis. More specifically, the present invention aims at improving the protection of the contents of the registers and especially of the destination registers of the operations executed within the integrated circuit and involving secret quantities.

The present invention also aims at providing a solution which is compatible with ciphering algorithms and more specifically with conventional secret key processing algorithms. In particular, the present invention aims at requiring no modification of the algorithm for the implementation of the protection, and at remaining transparent for the circuit user.

The present invention further aims at providing a solution which is adapted to protecting the content of destination register(s) of operation result(s) used as source register(s) for a subsequent operation, or the content of register(s) containing the final result.

To achieve these and other objects, the present invention provides an integrated circuit implementing at least one operator involving at least one secret quantity, and functionally comprising upstream and downstream of the operator at least one source register and at least one destination register, respectively, the integrated circuit further comprising means for loading a random or pseudo-random number at least into the destination register.

According to an embodiment of the present invention, said random number is loaded into the destination register before transfer of a result of the operator to this register.

According to an embodiment of the present invention, at least one temporary register is provided to store the content of the source register or of the result of the operator before transfer to the destination register.

According to an embodiment of the present invention, means for loading the temporary register with a random quantity are provided.

The present invention also provides an antifraud method comprising randomizing the content of a destination register of a result of an operator involving at least one secret quantity, and inputting a random quantity into the destination register before each loading of a result therein.

According to an embodiment of the present invention, the result of the operator is transferred to a temporary register before loading into the destination register.

BRIEF DESCRIPTION OF THE DRAWINGS

The foregoing objects, features, and advantages of the present invention will be discussed in detail in the following non-limiting description of specific embodiments in connection with the accompanying drawings.

DETAILED DESCRIPTION

Figure 1:
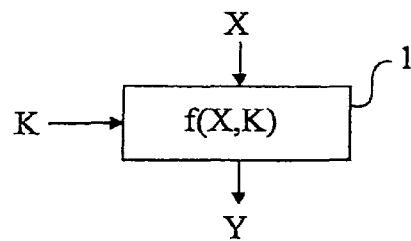
FIGS. 1 and 2, previously described, are intended to show the state of the art and the problem to solve.
Figure 2:
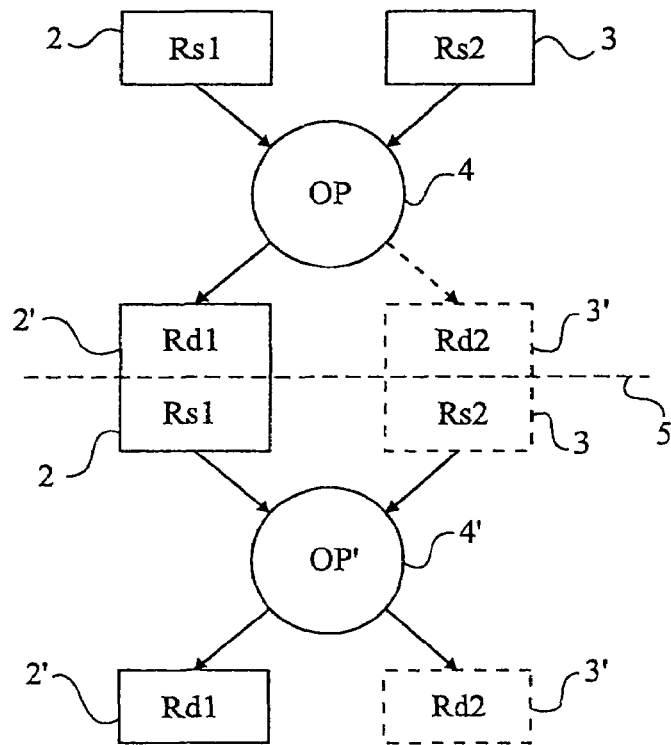

The same elements have been designated with the same reference numerals in the different drawings. For clarity, only those elements and those method steps that are necessary to an understanding of the present invention have been shown in the drawings and will be described hereafter. In particular, the actual algorithmic functions and especially the handling operations on the data contained in the registers have not been detailed, the present invention applying whatever the implemented operation, whether it is an arithmetic or logic operation, a copying or transfer operation, etc., and whatever the handled data.

A feature of the present invention is to mask the introduction of at least one result provided by at least one operator into at least one destination register by the previous introduction of random data into this register.

A feature of a preferred embodiment of the present invention is to provide at least one temporary register between the operator(s) and the destination registers, to enable introduction of at least one random data into the destination register(s). According to this embodiment, random data are also input into the temporary register(s) before any transfer from an operator.

Figure 3:
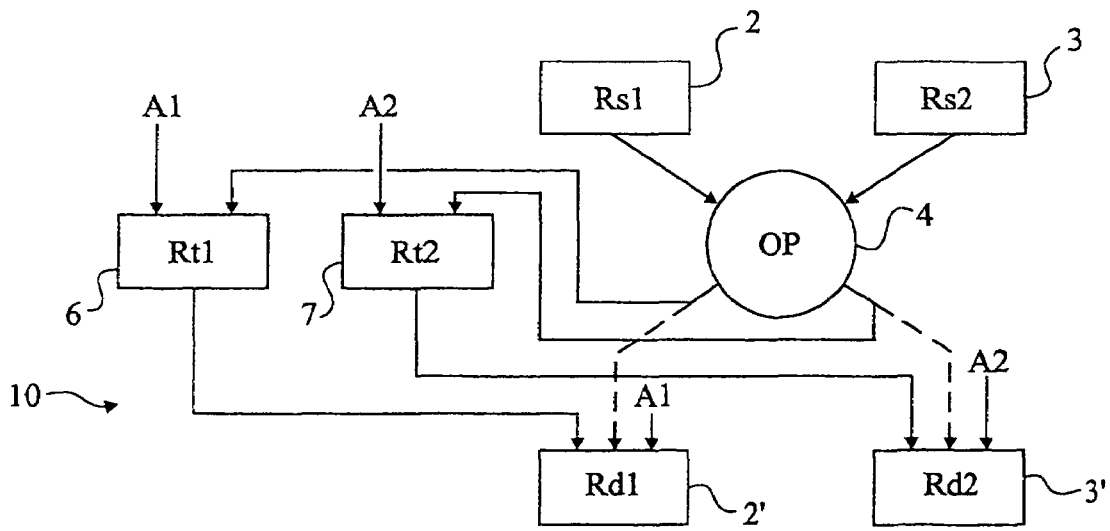
FIG. 3 shows an embodiment of an integrated circuit executing a secret quantity processing algorithm according to and embodiment of the present invention.

FIG. 3 very schematically shows in the form of blocks an embodiment of a calculation cell 10 according to the present invention.

As previously, one or several (here, two) registers 2 (Rs1) and 3 (Rs2) contain data to be submitted to an operation. The contents of these registers are transferred to a circuit in the form of an operator 4 executing an operation OP of an algorithm. One or several (here, two) registers 2' (Rd1) and 3' (Rd2) are intended to contain the result(s) provided by operator 4. Destination registers 2' and 3' may or may not form source registers of a subsequent operation.

According to the shown embodiment, operator 4 is connected to the input of one or several (here, two) temporary registers 6 (Rt1) and 7 (Rt2), preferably in the same number as the destination registers. The temporary registers are intended to receive the results provided by operator 4 before their transfer into destination registers 2' and 3', respectively.

Destination registers 2' and 3' as well as the optional temporary registers 6 and 7 are likely to be preloaded with random data. This function is illustrated in FIG. 3 by additional input terminals of registers 2', 3', 6, and 7 receiving random data words A1 for registers 2' and 6 and A2 for registers 3' and 7.

Figure 4A:
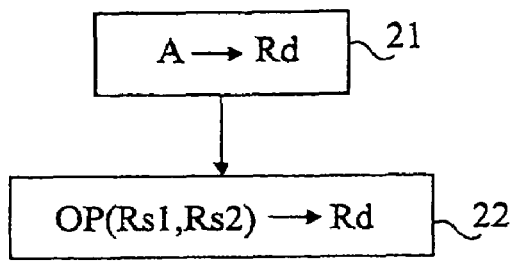
FIGS. 4A, 4B, and 4C illustrate, in the form of flowcharts, three examples of the embodiment of the circuit of FIG. 3.
Figure 4B:
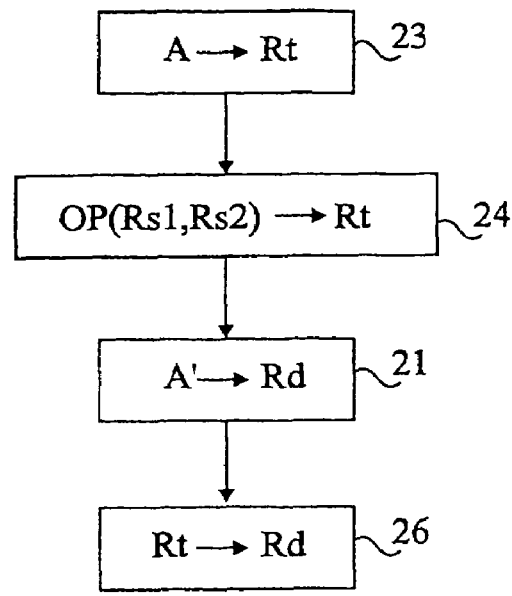
Figure 4C:
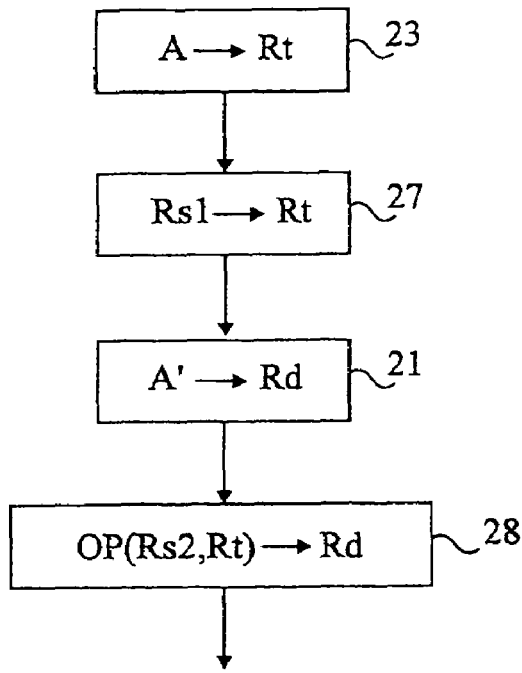

In FIG. 3, the connections of operator 4 to registers 2' and 3' have been illustrated in dotted lines to enhance their optionality, as will be seen hereafter in relation with the descriptions of examples of FIGS. 4A to 4C.

According to a feature of the present invention, before each loading of an operation result into a destination register, said register is filled with a random number. This random number introduction is performed by means of at least one conventional random or pseudo-random number generator which needs not be detailed.

Then, according to the type of operation and algorithm, the result(s) of operator 4 is (are) either stored in destination register(s) 2' and 3', instead of random numbers A1 and A2, or stored in temporary registers 6 or 7 as will be better understood hereafter in relation with the description of FIGS. 4A to 4C. Of course, the size of the generated random numbers is adapted to the size of the result numbers provided by operator 4.

Although preferable, it should be noted that it is not indispensable for the random numbers loaded into the different registers to be different from one another, provided that these numbers change regularly, preferably, for each new operation. Thus, a possible pirate is not able to exploit the physical signatures provided by the state switchings of the destination registers since these switchings start, preferably each time, from a different state.

In FIGS. 4A to 4C, reference is made to examples using a single destination register. It should however be noted discussion in relation with these examples of course applies to the case where several destination registers are used as well as to the case where one or several destination registers become the source registers of the next operation.

FIG. 4A shows a first example according to which the result of operator 4 combining the data of registers 2 and 3 is stored in a single destination register. In this case, the process begins according to this example of the present invention with storing (block 21) a random number A in a destination register Rd. Then, once the operation has been executed, result OP(Rs1, Rs2), representing the application of operator 4 to the contents of registers Rs1 and Rs2, is stored (block 22) in register Rd.

An advantage then is that the state switching of register Rd from random data A to the operation result cannot be used by a pirate exploiting a differential power or physical signature analysis. Indeed, since random number A changes for each execution of the operation, it will change for each variation of the input data on the basis of a same key hypothesis, and will thus provide no exploitable result for the pirate.

FIG. 4B illustrates a second example according to which a temporary register is used. According to this example, for each execution of the operation, a first random number A is first input (block 23) into a temporary register Rt. In a second step, result OP(Rs1, Rs2) of operator 4 is stored (block 24) in temporary register Rt. Then, a second random number A' is input (block 21) into destination register Rd. Finally, the content of temporary register Rt is transferred (block 26) to destination register Rd.

According to a first example where destination register Rd is connected with the source register (register looped back on the same operator), it will be necessary to introduce the random number into the destination register once the register has been discharged from its input data, that is, after step 24.

According to another example, steps 24 and 21 may be inverted and random number A' may be input during the sequence execution. The only constraint is for step 23 to come before step 24 and for step 21 to come before step 26.

FIG. 4C illustrates a third example of application of the circuit of the present invention. According to this example, a random number A is first input (block 23) into a temporary register Rt. Then, the content of source register Rs1 is transferred (block 27) to temporary register Rt. A second random number A' is stored (block 21) in the destination register. Finally, the operation of combining the content of register Rs2 and of temporary register Rt is performed, and the result OP(Rs2, Rt) is stored (block 28) in register Rd. There again, the order of the steps is an example only, provided that step 21 is before step 28 and step 23 is before step 27.

The example of FIG. 4C more specifically relates to the case where destination register Rd1 corresponds to source register Rs1, which imposes a requirement of discharging its content into the temporary register before inputting a random number into the destination register.

It should be noted that the transfer(s) from the source register(s) to the temporary register(s) (FIG. 4C) have not been illustrated by functional links in FIG. 3. This alternative is however possible.

An advantage of the present invention is that its implementation requires no modification of the protected algorithm. Only the organization of the data transfers is modified.

Of course, the present invention is likely to have various alterations, modifications, and improvements which will readily occur to those skilled in the art. In particular, its practical implementation is within the abilities of those skilled in the art based on the functional indications given hereabove. Further, from the moment that the integrated circuit is adapted to input one or several random numbers into the working registers associated with the algorithm execution operators, several cases can be envisaged, only some examples of which have been described hereabove. In particular, the use of temporary registers is not indispensable. Moreover, the optional transfers to temporary registers may be performed either for the source data, or for the destination data, provided that the destination register can be filled with a random number before the result of the operation is input therein. Further, the operation between source and destination registers may be any operation implemented by a processor and modifying a register (for example, the operation of copying one register into another). Additionally, the destination register may consist of a flag register containing a single bit, randomly pre-positioned according to the present invention.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An integrated circuit implementing at least one operator involving at least one secret quantity, and functionally comprising upstream and downstream of the operator at least first and second source registers and at least one destination register, respectively, at least one temporary register means for loading a first random or pseudo-random number into the temporary register, means for transferring the content of the first source register to the temporary register, and means for loading a second random or pseudo-random number into the destination register, the operator combining the content of the second source register and the temporary register and storing the result in the destination register.

2. An antifraud method comprising randomizing a content of a destination register of a result of an operator involving at least one secret quantity, and inputting a random quantity in the destination register before each loading of a result therein, further comprising loading a first random or pseudo-random number into a temporary register, transferring the content of a first source register to the temporary register, loading a second random or pseudo-random number into the destination register, the operator combining the content of a second source register and the temporary register and storing the result in the destination register.

3. An integrated circuit comprising:
   an operator configured to perform an operation on a secret quantity;
   a destination register coupled to receive a result of the operation;
   first and second source registers;
   a temporary register; and
   a control circuit configured to load a first random or pseudo-random number into the temporary register, to transfer the content of the first source register to the temporary register, and to load a second random or pseudo-random number into the destination register, the operator combining the content of the second source register and the temporary source register and storing the result in the destination register.

4. An integrated circuit as defined in claim 3, wherein the destination register is a source register for a second operator.

5. An antifraud method comprising:
   randomizing a content of a destination register coupled to receive a result of an operation involving a secret quantity before transfer of a result into the destination register, to protect against attacks by physical signature analysis, further comprising loading a first random or pseudo-random number into a temporary register, transferring the content of a first source register to the temporary register, loading a second random or pseudo-random number into the destination register, the operator combining the content of a second source register and the temporary register and storing the result in the destination register.

6. An antifraud method as defined in claim 5, further comprising using the destination register as a source register for a second operation.

7. An antifraud method comprising:
   loading a first random or pseudo-random number into a temporary register;
   transferring the content of a first source register to the temporary register;
   performing an operation on a secret quantity to produce a result, the operation combining the content of a second source register and the temporary register;
   loading a random or pseudo-random number into a destination register that is coupled to receive the result of the operation, to protect against attacks by physical signature analysis; and
   transferring the result of the operation into the destination register.

* * * * *